United States Patent [19]

Barnard

[11] Patent Number: 5,497,676
[45] Date of Patent: Mar. 12, 1996

[54] ACTUATOR CONTROL ASSEMBLY FOR MOTION FURNITURE

[75] Inventor: Michael A. Barnard, Wichita, Kans.

[73] Assignee: Wescon Products Company, Wichita, Kans.

[21] Appl. No.: 222,534

[22] Filed: Apr. 4, 1994

[51] Int. Cl.⁶ ...................................................... F16C 1/10
[52] U.S. Cl. .................................. 74/501.5 R; 74/500.5; 74/501.6; 74/506; 411/913; 297/69; 297/463.1; 16/295; 16/307; 16/308
[58] Field of Search ........................... 74/501.5 R, 501.6, 74/500.5, 502, 506, 567; 411/508, 509, 913, 55; 297/69, 423.19, 423.2, 423.28, 463.1, 463.2, 354.1, 411.1; 403/256, 259, 261; 220/3.5, 3.6, 242, 327, 328, 241; 16/295, 307, 308

[56] References Cited

U.S. PATENT DOCUMENTS 2,793,782  5/1957  Austin ...................................... 220/3.6
5,107,720  4/1992  Hatfield ..................................... 74/502

FOREIGN PATENT DOCUMENTS 2273527  6/1994  United Kingdom ..................... 16/308

Primary Examiner—Charles A. Marmor
Assistant Examiner—Chong H. Kim
Attorney, Agent, or Firm—Hovey, Williams, Timmons & Collins

[57] ABSTRACT

A cable actuator control assembly for motion furniture such as lounge chairs having shiftable footrests and the like, includes a cable assembly (16), a cable actuator module (12) having a pivot assembly (46) connecting rearward base (18) and front handle (20) for shifting a cable (92) between first and second positions, a channel including an apertured bight (78) connecting opposed legs (80 and 82), and bolts (88) for biasing channel (14) into engagement with boss (28). Self-tensioning pivot assembly (52) includes coaxially aligned pins (62 and 64) connected by coiled spring (72).

6 Claims, 2 Drawing Sheets

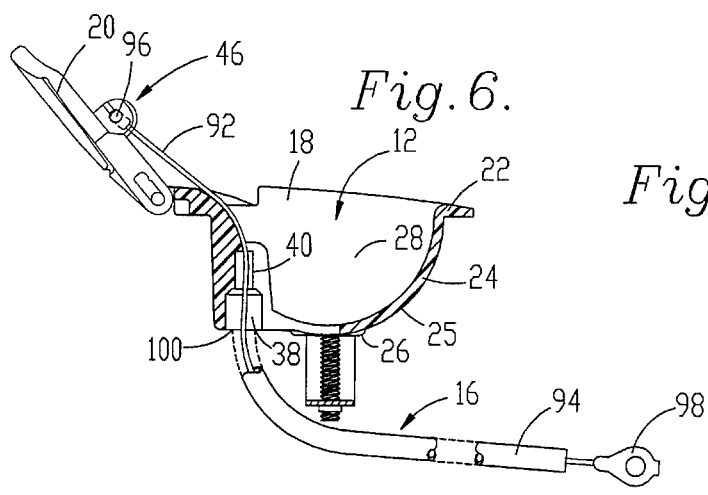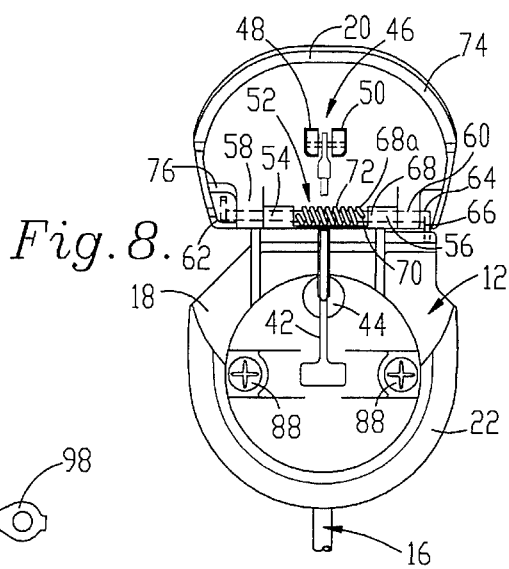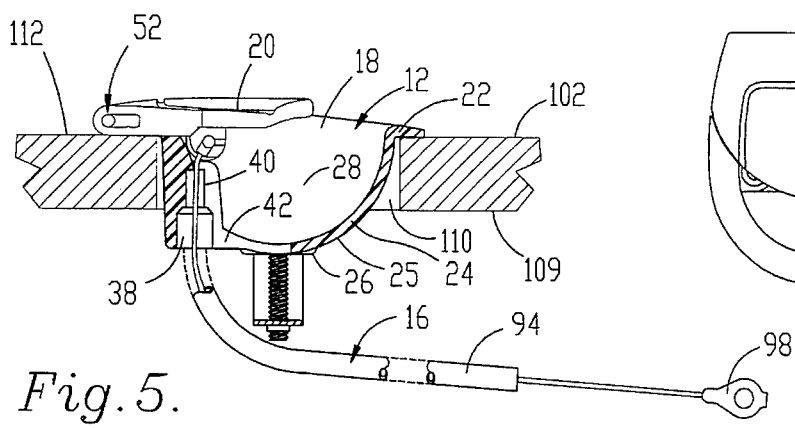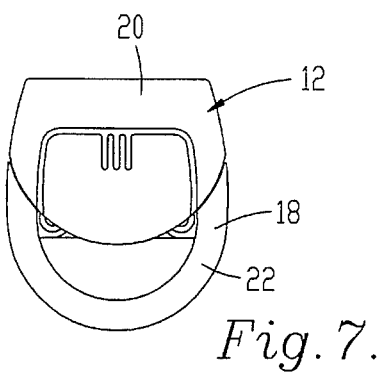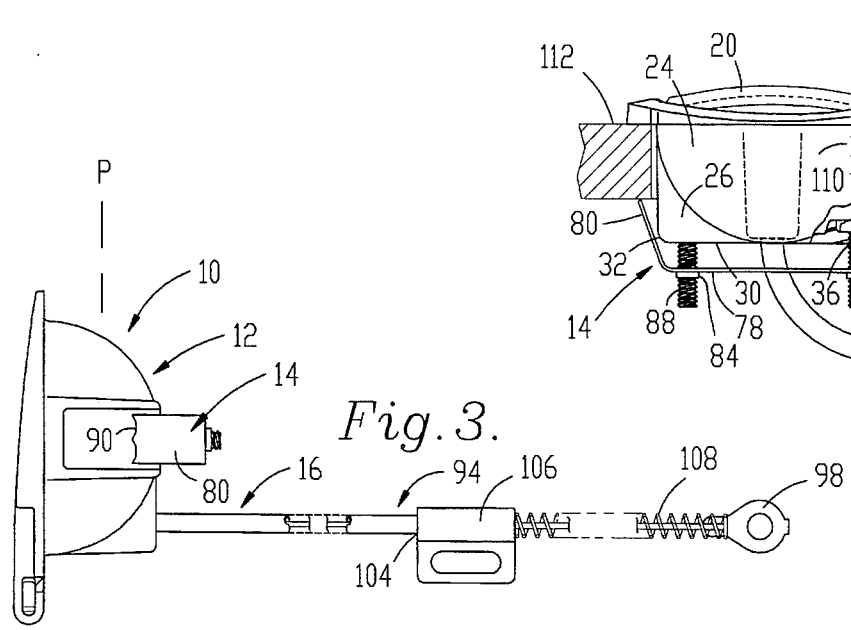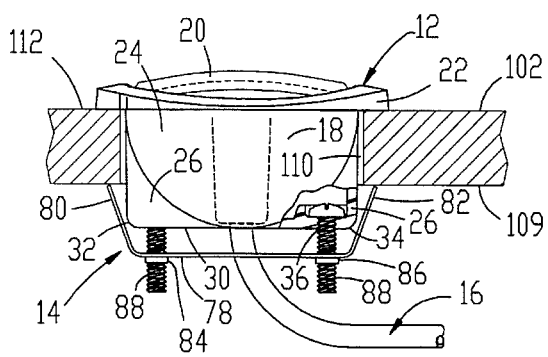

ACTUATOR CONTROL ASSEMBLY FOR MOTION FURNITURE

BACKGROUND OF THE INVENTION

1. Field of the Invention

The invention pertains to the field of cable actuator control assemblies that may be utilized, for example, in motion furniture such as lounge chairs having shiftable foot rests and the like. More particularly, the invention involves an adjustable control assembly including a shiftable cable operably coupled with a cable actuator module for shifting the cable between a first position and a second position. The module may be coupled with an adjustable channel having a bight connecting opposed legs depending from the bight at a normally obtuse angle for retaining the module in a wall of an article of furniture. The module may include a self-tensioning pivot assembly pivotally connecting a handle and a base, and the cable may be connected to the module at a rearmost position away from the handle where the cable is most resistant to frictional binding caused by rerouting the cable over itself in installation.

2. Description of the Prior Art

Bowden cable assemblies, i.e., those having a shiftable cable partially received within a tubular sheath have been utilized in mechanical actuator assemblies. For example, these cables may be connected with levers for lawn mower drive engagement or throttle control. Bowden cables have also been utilized as a portion of a mechanical linkage for selectively locking and unlocking moveable portions of household furniture such as lounge chairs having a shiftable foot rest.

Prior motion furniture control assemblies have included a Bowden cable assembly coupled with a pivotal handle for shifting the cable between first and second positions. The handle can be coupled with a rectangular support base, which is typically mounted in an article of furniture by cutting a rectangular hole in a wall of the furniture, and inserting the rectangular base in the hole. The base may have a lip covering the exterior portion of the wall proximal to the hole, and is typically retained by threadably coupling the base with a bracket proximal to the interior side of the wall.

These prior control assemblies cannot be adjusted to various selected positions of comfort in use after they have been installed, because the rectangular hole precludes any clockwise or counter clockwise rotation of the base with respect to the plane of the wall in which it is retained. Furthermore, installation of these prior devices may be complicated by having the cable exit from the side of the base, in which case the cable tends to kink and bind as it must be reversed over itself prior to connecting with an interior furniture control lever mechanism. The control handle may remain in an awkward extended position after the handle has been manipulated to shift the cable for its primary control purposes, due to the resulting friction between the cable and the Bowden sheath.

SUMMARY OF THE INVENTION

The invention resolves the problems that are outlined above by providing a cable actuator control assembly that, even after its initial installation, may be selectively rotated to various positions within the plane of the wall in which it is received. Furthermore, the control assembly includes a self tensioning pivot assembly that serves to return the outwardly pivoted handle with increased force, while allowing outward pivoting of the handle with decreased force as compared to prior controls. Additionally, the Bowden cable is attached to the control assembly in a manner that substantially prevents binding of the cable due to rerouting the cable in coils or kinks over itself.

The selectively adjustable cable actuator control assembly of the invention broadly includes an elongated shiftable cable presenting a first end and a second end; and a cable actuator module including a handle operably coupled with the cable for shifting the cable between a first position and a second position relative to the module. A channel including a bight connecting opposed legs depending from the bight at a normally obtuse angle relative to the bight may be coupled with the module for retaining the module in an article of furniture. The module preferably has a base including an intermediate section connecting opposed knuckles for contacting and spreading the legs to contact the furniture.

In preferred embodiments, the actuator module may incorporate a self-tensioning pivot assembly coupling the base and the handle portion of the module. This pivot assembly includes a coiled spring presenting opposed spring ends and a pair of opposed pins extending along a common axis. Each of the pins has a slotted head and a body, with the body having a spring-receiving aperture for retaining one of the spring ends. The base and the handle have structure for receiving the pins in a manner allowing for tightening of the spring concomitant with pivotal rotation of the handle around the common axis.

Other preferred embodiments include connecting the cable with the module in an orientation that substantially reduces the potential for binding and kinking of the cable. The module has a rearward opening for receiving the cable at a position remote from the handle. The cable passes through the opening with an axis of elongation in the cable proximal to the opening having an orientation substantially perpendicular relative to the plane of a wall in which the module may be mounted.

BRIEF DESCRIPTION OF THE DRAWINGS

FIG. 3 is a left side elevational view of the cable actuator control assembly of the invention, with the right side view being a mirror image thereto;

FIG. 4 is a bottom view depicting the FIG. 3 assembly received within a hole in an article of furniture;

FIG. 5 is a partial sectional left side view of the FIG. 4 installation rotated 90° in the page with respect to the side view of FIG. 3;

FIG. 6 depicts the FIG. 5 view having the handle thereof pivoted outwardly for shifting of the cable within its sheath;

FIG. 7 is a front view depicting the handle received over the base of the module; and FIG. 8 is an enlarged front view of the control module with the handle thereof pivoted outwardly to expose the interior pivot assembly.

DETAILED DESCRIPTION OF THE PREFERRED EMBODIMENT

Figure 2:
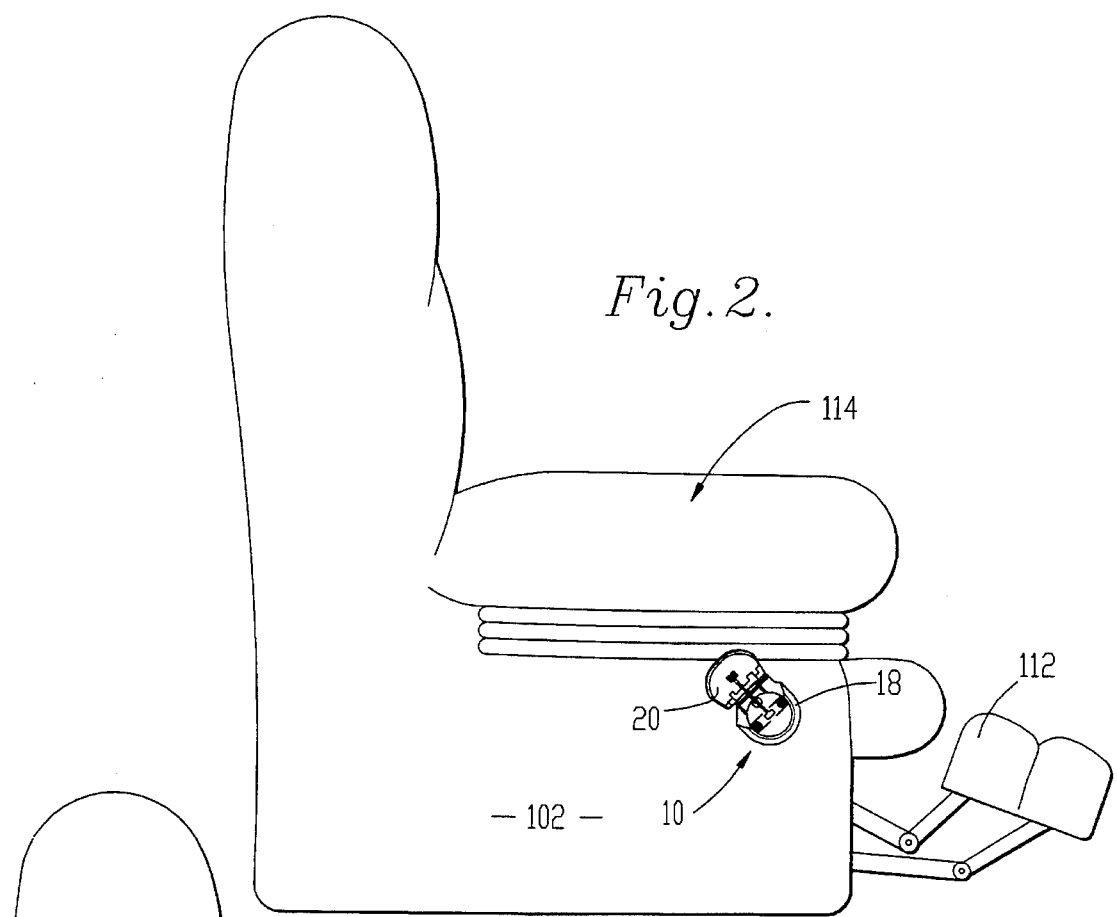
FIG. 2 depicts the lounge chair of FIG. 1 having the foot rest in an upraised position and the cable control actuator assembly with a handle thereof pivoted outwardly for unlocking the foot rest from its upraised position just prior to returning the foot rest to the lowered position of FIG. 1.
Figure 1:
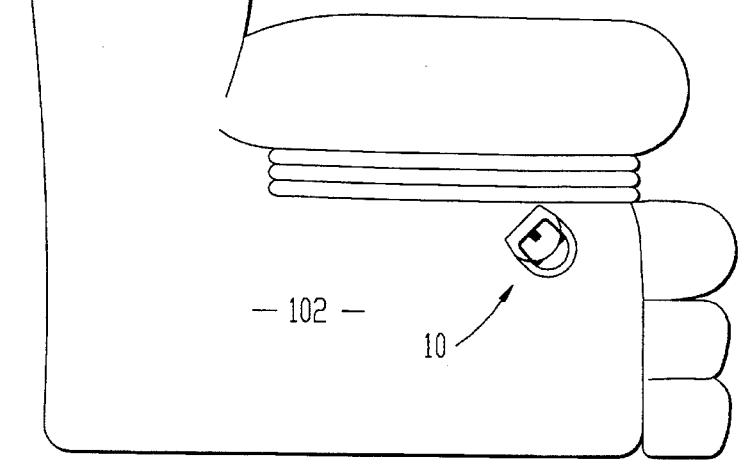
FIG. 1 is a right side elevational view of a lounge chair having a shiftable foot rest portion and a cable control actuator assembly of the invention.

Referring now to the drawings, a cable actuator control assembly 10 of the present invention is shown in FIG. 3. The assembly 10 includes a cable actuator module 12, a channel spring assembly 14, and Bowden cable assembly 16.

FIGS. 4 through 8 depict control module 12 having base 18 and handle 20. Base 18 has outer lip 22 completely surrounding its outer front perimeter. Rearwardly of lip 22, base 18 includes an arcuate wall 24 having a rearward surface 25 (FIGS. 5 and 6) integrally joined with rectangular boss 26, and a frontward surface defining contoured recess 28.

Boss 26 has an intermediate section 30 (FIG. 4) connecting opposed rounded corners or knuckles 32 and 34. Section 30 includes a pair of apertures, e.g., 36, each proximal to a corresponding knuckle. Cylindrical opening 38 (FIG. 5) is tapered in its radial dimension to form a smaller centrally aligned cylindrical cavity 40. Opening 38 and cavity 40 connect with slot 42 to form a passage through knob 44 from the rearward surface 25 to the frontward surface 28 of base 18, with opening 38 and cavity 40 being aligned around a common axis of symmetry. Slot 42 allows passage of cable assembly 16 through wall 24, and permits flexion of opening 38 for enhanced clamping of cable assembly 16.

Handle 20 includes slotted cable anchor mount 46 (see FIGS. 6 and 8) having opposed slotted lobes 48 and 50 depending from the rearward handle surface. Handle 20 partially covers recess 28 in the inwardly pivoted position depicted in FIG. 5.

Pivot assembly 52 (FIG. 8) pivotally couples handle 20 with base 18. Assembly 52 includes apertured ears 54 and 56 which are integrally formed with base 18, as well as apertured ears 58 and 60 which are integrally formed with handle 20. The respective ears 54, 56, 58, and 60 are apertured to receive identical pins 62 and 64 aligned along a common axis of elongation. Pins 62 and 64 each have a respective slotted head, e.g., head 66, and an elongated slotted body, e.g., body 68. Body 68 has an end, opposed from head 66, that provides an axially extending slot 68a for receiving end 70 of coiled tension spring 72. Handle 20 presents a rearwardly depending rim 74 providing a means for retaining pins 62 and 64 within their respective apertures by preventing outward movement of pins 62 and 64 towards rim 74. Additionally, the head of pin 64 is partially retained beneath lip 22 proximal to assembly 52 for preventing forward rotation of pin 64, while the head of pin 62 contacts retaining nib 76, which is integrally formed with handle 20 for forcing rotation of pin 62 concomitant with pivotal motion of handle 20.

FIG. 4 depicts spring 14 having bight 78 connecting and integrally formed with opposed legs 80 and 82. From the FIG. 4 perspective, each of legs 80 and 82 extend from bight 78 at an oblique angle taken outwardly from the top of the bight to each leg. The angle may be any obtuse angle, but preferably ranges between 91° and 160°. Bight 78 includes a pair of opposed threaded apertures 84 and 86 for receiving a corresponding bolt, e.g., identical bolts 88, and presents a width dimension between legs 80 and 82 of a dimension less than the corresponding dimension of section 30 between knuckles 32 and 34. FIG. 3 depicts leg 80 having a serrated edge 90, with leg 82 having a identical edge on the opposite side.

FIG. 6 depicts Bowden cable assembly 16 including axially shiftable cable 92 received within plastic tubular sheath 94. Cable 92 includes a first end providing an anchor mount connector 96 complementary with slotted anchor mount 46 for engagement therewith, as well as a second end opposed from the first end and retained within connector 98 for coupling with an interior furniture control lever (not depicted). Sheath 94 presents a first end 100 adhesively mounted within opening 38 at a position extending from the rearmost surface of wall 24 to allow shiftable passage of cable 90 through opening 38. The portions of sheath 94 and cable 92 proximal to opening 38 each present an axis of elongation having an orientation substantially parallel to a line drawn perpendicularly to the plane P (FIG. 3), which runs parallel with wall 102. End 104 of sheath 94 is coupled with apertured fastener 106. Additionally, compression spring 108 surrounds a portion of cable 92 proximal to connector 98 for biasing connector 98 away from fastener 106.

FIGS. 4 and 5 illustrate that assembly 10 is preferably installed within a circular hole 110 formed in furniture wall 102. Cable assembly 16 and spring 14 are pushed through hole 110 from the front 112 of wall 102 until legs 80 and 82 are respectively free from rearward contact with wall 102, with lip 22 overlapping the frontward edges of wall 102 defining hole 110. Handle 20 is next pivoted outwardly away from base 18 to expose the heads of bolts 88 as depicted in FIG. 8. Bolts 88 are tightened to force spring 14 into engagement with boss 28, thereby causing legs 80 and 82 to engage respective knuckles 32 and 34 for spreading legs 80 and 82 outwardly to a width dimension greater than the diameter of hole 110. Bolts 88 are tightened until the respective channel edges 90 securely engage the rearward face 109 of wall 102 for clamping wall 102 between lip 22 and channel 14. The Installation process is completed by attaching fastener 106 and connector 98 to appropriate interior furniture mechanisms for controlling the selective locking and unlocking, or other similar mechanical actuation, of a conventional shiftable furniture mechanism (not depicted).

In operation, the installed control assembly 10 may be pivoted outwardly as depicted in FIG. 2 to shift cable 92 from a first position to a second position relative to sheath 94, thus moving coupling 98 relative to fastener 106. The coupling may be connected any desired mechanism and used, for example, in tripping an interior lever for the collapse of footrest 112 of lounge chair 114. By this pivotal motion, nib 76 of handle 20 rotates pin 62 relative to pin 64 while lip 22 prevents the rotation of pin 64 to tension coiled spring 72 through relative motion of the spring-receiving slots 68a. This increased tension exerts a rearward force opposing outward pivotal motion that progressively increases as handle 20 is pivoted away from base 18. After handle 20 is released from outward pivotal motion, this force is communicated by mechanical linkage to cable 92 and progressively decreases with the corresponding inward rotation. Similarly, outward rotation of handle 20 compresses spring 108, which biases coupling 98 towards the extended position of FIG. 3.

At any time after the initial installation, handle 20 may be pivoted outwardly to the position depicted in FIG. 8, and bolts 88 may be loosened to cause channel 14 to loosen its contact with wall 102. Thereafter, module 12 may be subjected to clockwise or counter-clockwise rotation within the plane of wall 102 to any selected position providing an ergonomic advantage in operating chair 112. Note that the rearmost mounting position of sheath 94 with respect to base 18 is advantageous in that cable assembly 16 need not be rerouted in circles upon installation which, in any other orientation, could enhance binding of cable 92 against sheath 94 and cause a corresponding increase in frictional resistance opposing the shifting of cable 92.

Those skilled in the art will understand that the preferred embodiments, as hereinabove described, may be subjected to obvious modifications without departing from the true scope and spirit of the invention. Accordingly, the inventor hereby states his intention to rely upon the Doctrine of Equivalents, as well as all other means available to protect his full rights in the invention.

I claim:

1. Motion furniture presenting a panel having opposed front and rear faces, said motion furniture comprising:

structure defining a generally circular opening through said front panel; and a selectively adjustable cable actuator control assembly, said assembly including:

an apertured based positioned within said opening and including a peripheral flange engaging the front face of said panel adjacent the opening, said base presenting a forward surface and an opposed rearward surface;

attachment structure operable for engaging the rear face of said panel adjacent said opening;

selectively rotatable connection means extending through said base and operably coupled with said attachment structure, said connection means being accessible at said forward surface of said base for selective rotation thereof, said connection means being rotatable in one direction for tightening of the attachment structure against said rear face of said panel in order to secure said base in a selected position, and being rotatable in the other direction for loosening of the attachment structure;

said base being rotatable within said circular opening upon said loosening of said attachment structure for permitting selective alteration of the rotational position of said base within said opening;

a handle pivotally coupled to said base;

an elongated, shiftable cable presenting a first end passing through said base aperture; and means operably interconnecting said handle and said first end of said cable.

2. The invention of claim 1, said interconnecting means including means operably interconnecting said handle and said first end of said cable including means for maintaining a segment of the cable adjacent said base in a generally perpendicular relationship relative to said panel in order to accommodate said selective alteration of the rotational position of said base.

3. The invention of claim 1, said base having a generally concavoconvex shape.

4. The invention of claim 1, said attachment structure including a bight proximal to said rearward surface of said base and a pair of endmost legs engaging said rear face of said panel.

5. The invention of claim 4, said connection means comprising threaded apertures on said attachment structure.

6. The invention of claim 1, said handle being coupled to said base proximal to said flange.

* * * * *